United States Patent [19]
Garst

[11] Patent Number: 5,640,798
[45] Date of Patent: Jun. 24, 1997

[54] METHOD FOR MAKING A FISHING LURE WITH UNDULATING FINS

[76] Inventor: Gregory C. Garst, Rte. 3 Box 478, Many, La. 71449

[21] Appl. No.: 476,220

[22] Filed: Jun. 7, 1995

Related U.S. Application Data

[62] Division of Ser. No. 283,599, Aug. 1, 1994, abandoned.

[51] Int. Cl.$^6$ .............................. A01K 85/00; A01K 85/01
[52] U.S. Cl. ...................... 43/42.53; 43/42.06; 43/42.24; 43/42.36
[58] Field of Search ................... 43/42.06, 42.24, 43/42.53, 42.26, 42.27, 42.21, 42.28, 42.3; 264/328.1, 328.2; 249/55; 425/543

[56] References Cited

U.S. PATENT DOCUMENTS

| | | | |
|---|---|---|---|
| 3,958,358 | 5/1976 | Firmin | 43/42.51 |
| 4,069,610 | 1/1978 | Firmin | 43/42.24 |
| 4,108,955 | 8/1978 | Thom | 264/222 |
| 4,196,884 | 4/1980 | Zeman | 43/42.39 |
| 4,214,396 | 7/1980 | Firmin | 43/42.24 |
| 4,317,305 | 3/1982 | Firmin | 43/42.24 |
| 4,516,352 | 5/1985 | Firmin | 43/42.26 |
| 4,744,168 | 5/1988 | McClellan | 43/42.24 |
| 5,058,309 | 10/1991 | Firmin | 43/42.13 |
| 5,197,219 | 3/1993 | Cook, Jr. et al. | 43/42.06 X |
| 5,333,405 | 8/1994 | Bowles | 43/42.24 X |

FOREIGN PATENT DOCUMENTS

| 2647636 | 6/1989 | France | 43/42.26 |
|---|---|---|---|

Primary Examiner—Jeanne Elpel
Attorney, Agent, or Firm—Patterson & Streets, L.L.P.

[57] ABSTRACT

An artificial, aquatic fishing lure which imitates the swimming motion of fresh and salt water fish and the method of manufacturing the same. The lure is used with a rod, line, hook, and usually a reel. A die is first formed having a cavity for forming an elongate body having thin, flexible fins extending along the body of the lure where the outer edges of these fins are longer in length than the attached edges. In another embodiment, a tail portion is formed which may be helical in shape or ruffled. The helical design is present in a relaxed state. On tow through water, the helix is extended in a planar manner so that the fin forms a wavy or ruffled sheet-like membrane. In another embodiment, the lure is formed with a tail comprising two appendages which extend from the distal tail portion of the elongate body in an adjacent relationship to one another. In tow through water, the appendages which comprise the tail separate and effect the desired motion. In the preferred embodiment, the fins are arranged such that, in tow, a wavy or ruffled configuration is obtained.

3 Claims, 4 Drawing Sheets

METHOD FOR MAKING A FISHING LURE WITH UNDULATING FINS

This is a divisional of U.S. patent application Ser. No. 08/283,599 filed Aug. 1, 1984, now abandoned.

FIELD OF THE INVENTION

The present invention relates generally to the art of fishing lures, and, in particular, to an artificial lure for attracting and catching fish in both fresh and salt water and a method of making the same.

BACKGROUND OF THE INVENTION

Commercial and sport fishing have become a major industry. The goal of the fisherman is to catch the most and the biggest fish that he possibly can catch. In helping a fisherman to accomplish this goal, the design of artificial lures plays a very important role. Artificial lures are typically configured to reproduce the likeness and movement of bait fish, worms, lizards, and other swimming creatures upon which game fish, large and small, feed. At the same time, the lure must allow the fish to be hooked or caught.

Several attempts have been made to design an artificial lure which simulates the life-like action of fresh water and salt water fish. Examples of these attempts include U.S. Pat. Nos. 4,214,396, 4,317,305, 4,069,610, 3,958,358, 2,854,779, 2,785,497, and 994,927.

In the early development period, the object was to duplicate the "look" of the bait fish. As design became more sophisticated, the object became appropriating the "feel" and "movement" of the bait fish. Movement of a lure is a critical feature. Known prior art lures may look attractive, but they do not possess the features which create realistic movement. Similarly, lures which display life-like movement may not look real, Finally, designers are faced with the problems of designing lures which look and act like a real bait fish, yet are easily manufactured in quantity.

As an example, one such lure having a single wavy or rippled fin on one side of the body or tail of a lure has been commercially successful from the manufacturing standpoint. However, heretofore, no one has suggested a lure having two wavy, rippled, or undulating fins on the body or tail of the lure. A single fin lure is easily manufactured using injection molding. The mold is configured so that the single fin is molded in substantially flat form when viewed in the horizontal plane.

In most fabrication processes which have preceded the present invention, the mold was normally comprised of two parts to facilitate separation thereof when extracting the lure. The molding process previously used employed bilateral mold plates which were tooled to receive the lure material. The plates were tooled so that concave depressions could receive the lure material. This configuration was necessary because it was difficult to match plates with both concave and convex aspects. This normally results in a seam at the joining of the two portions of the mold. In the past, the single fin was aligned along the axis of the seam. If the plates were not matched appropriately, the result would be flash along the edges of the lure. Also, in the past, the manufacturer of the lure started with two plates having planar surfaces which had been prepared to abut one another.

SUMMARY OF THE INVENTION

The present invention comprises an article of manufacture which has a bait body and multiple fins extending from the body and a method of making the same. These fins may be either rippled, undulating or helical in shape and design. Under tow, the helical shaped fins straighten and resemble undulating or rippled fins. These undulating fins produce movement which simulates the desired movement of bait fish. The method of making the lure comprises forming a die or molding plates with both concave and convex aspects which in combination form the shape of a lure body with undulating or rippled fins and injecting a suitable lure material into the mold.

The lure of the present invention may be constructed by the process of injection molding. The prior art limitation of providing only a single, flat fin has been overcome. The mold is configured so that each fin is attached in a straight plane along the length of the lure body, with the outer edges of the fins being formed in a ruffled or undulating shape. This construction allows the fins to be molded or formed in the ruffled or undulating shape. It is this ruffled characteristic which enables the lure to move in a life-like manner in tow. Slow movement of the lure through the water causes the lure to undulate or wiggle. The correlation between the thickness and flexibility of the fins provides different types of motion in the lure. The thicker the fins, the less flexibility resulting in slower motion. Thinner and more flexible fins allow the lure to undulate or wiggle more rapidly in tow.

In its preferred embodiment, the lure is constructed of suitable material to reflect life-like characteristics while maintaining the necessary functional characteristics. One example of material is worm plastic, a plastic of flesh-like consistency which has become widely known and used in the artificial bait industry.

The body is of substantially cylindrical cross section and can be notched or striated along its length with spaced indentations or grooves which may be concentric with the central axis of the body. The striations or notches may extend 360° or may only encircle a portion of the body. The head portion of the elongate body is of sufficient size to anchor and support the insertion of a hook. The distal portion of the body may taper gradually along its length so that the pair of fins extend beyond the distal portion of the body. The flexible fins are preferably formed as an integral part of the elongate body and extend from a proximal head portion of the elongate body to a distal tail portion.

The rearward portion of this embodiment can be shaped to form a tail of generally caudal shape to impart movement to the lure. The lure of the present invention is normally used as bait by passage of a hook having a weighted head portion through the proximal or head portion of the elongate body. Also, the lures can be used in conjunction with what is known in the fishing industry as a Texas rig or Carolina rig.

The lure of the present invention produces a new concept of motion in soft lures. The fins or appendages provide enhanced motion in the lure. This motion ranges from undulating to vibrating. This feature has the added advantage of attracting both large and small game fish.

These and other features are better understood by reference to the following detailed description of the attached drawings to which reference is made. In the drawings, similar numbers are used to represent similar components in the different figures.

BRIEF DESCRIPTION OF THE DRAWINGS

So that the manner in which the above recited features, advantages and objects of the present invention are attained and can be understood in detail, more particular description of the invention may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENTS

Figure 1:
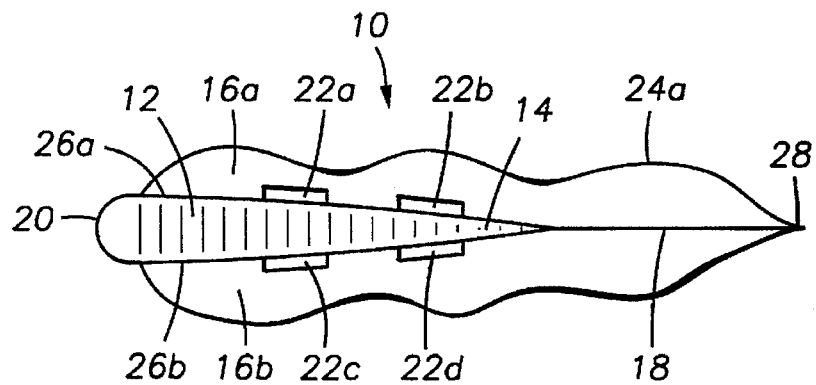
FIG. 1 depicts a top view of an artificial lure forming an embodiment of the present invention.
Figure 2:
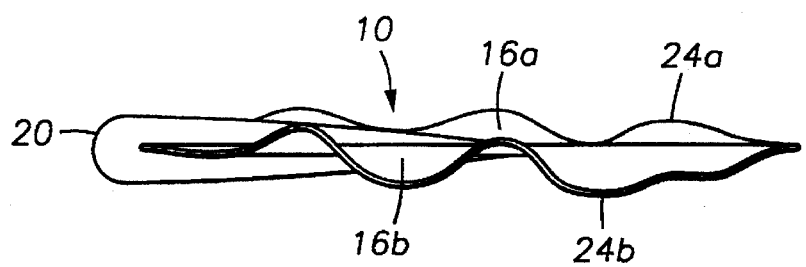
FIG. 2 depicts a side view of the artificial lure of FIG. 1.

Referring to FIGS. 1 and 2, there is shown a plastic lure 10 which has a generally elongate body 12 which tapers toward its distal tail portion 14 and a pair of fins 16a and 16b attached to the elongate body 12 which extend along a major portion of the length of the elongate body 12. The fins 16a and 16b have outer edges 24a and 24b and an attached edge 26a and 26b. These thin, flexible, membrane-like fins 16a and 16b display a wavy, rippled, or undulating appearance. Under tow through water, these fins 16a and 16b undulate or ripple to simulate life-like action in both the fins 16a and 16b and the movement of the elongate body 12. The fins 16a and 16b fuse toward the distal portion of the elongate body 12 along a centerline 18 in one embodiment. The elongate body has a head portion 20 which is typically larger than the distal tail portion 14. The fins 16a and 16b may also include vents 22a, 22b, 22c, and 22d. The vents 22a, 22b, 22c, and 22d are preferably placed in various areas to enhance the movement.

Typically, the vents 22a, 22b, 22c, and 22d are placed along the attached edge of the fins. Typically, fluid flow across the fins is substantially laminar. With the inclusion of vents through the area of the fins, turbulent flow is created causing greater vibration in the lure. The fused portion 28 of the fins 16a and 16b may taper towards the centerline 18.

Figure 3:
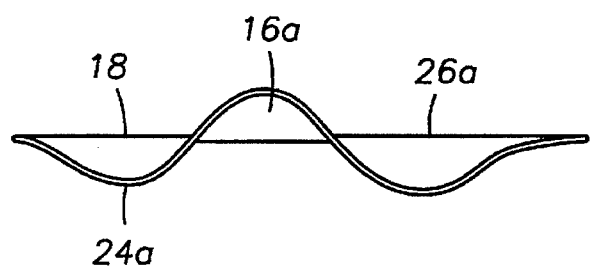
FIG. 3 is a schematic depicting the longitudinal centerline of the attached portions of the fins and the variable degree of sweep formed by the outer edges of the fins.

FIG. 3 illustrates the straight planar or straight line attachment of the flexible fins 16a and 16b with the elongate body 12 of FIG. 1. The fins 16a and 16b are relatively thin in cross section. The surplus material, formed in the fins 16a and 16b in a manner described hereinafter in greater detail, enables the formation of ruffles in the fins which vibrate under tow through the water. The wavy or ruffled fins 16a and 16b provide sweep. The larger the ruffle, the greater the sweep. The degree of sweep can be varied by increasing the angle "a", as best shown in FIG. 3 formed by the fin and a horizontal plane. The length of the outer, unattached edges 24a and 24b of the fins 16a and 16b can be increased to provide additional fin surface area for lures having greater angles. The increase in the angle with resulting greater sweep provides greater resistance of the lure in tow. The attachment of the fins 16a and 16b in a horizontal configuration enables the fins and the lure to vibrate in a vertical plane to simulate an up and down swimming or vibrating motion. Conversely, as stated below and seen in various figures, attachment of the fins in a vertical configuration as dorsal and ventral fins enables the lure to vibrate in a horizontal plane to simulate a side to side swimming or vibrating motion.

Figure 4:
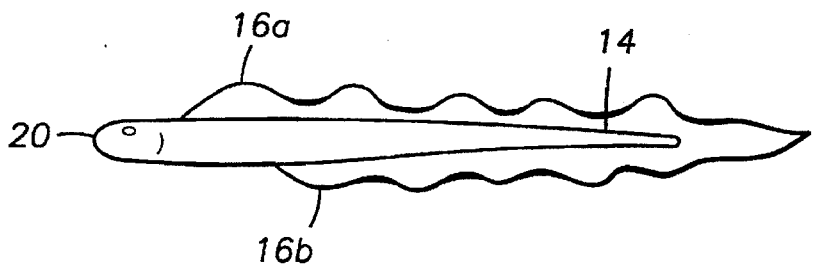
FIG. 4 depicts a side view of an artificial lure forming another embodiment of the present invention.
Figure 5:
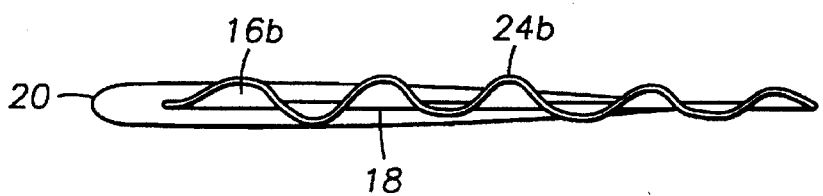
FIG. 5 depicts a top view of the artificial lure of FIG. 4.
Figure 6:
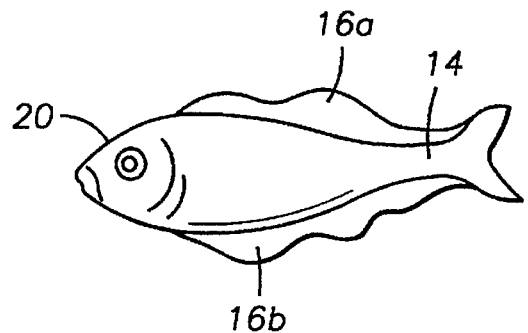
FIG. 6 depicts a side view of a minnow forming another embodiment of the present invention.

As stated above, the fins can be oriented in a horizontal position as seen in FIGS. 1 and 2 or in a vertical position as shown in FIGS. 4, 5 and 6. FIGS. 4, 5 and 6 illustrate embodiments emphasizing fins oriented in a vertical position. In the vertical arrangement, the fins 16a and 16b are attached to the elongate body 12 in a straight planar or straight line configuration and formed as described above. This configuration provides both a dorsal and a ventral fin for the lure. This vertical configuration enables a side to side swimming movement or vibrating motion to be imitated by the lure. This lure body type represents an eel-like fish (FIG. 4) or minnow (FIG. 6) having a head portion 20 and a distal tail portion 14.

Figure 7:
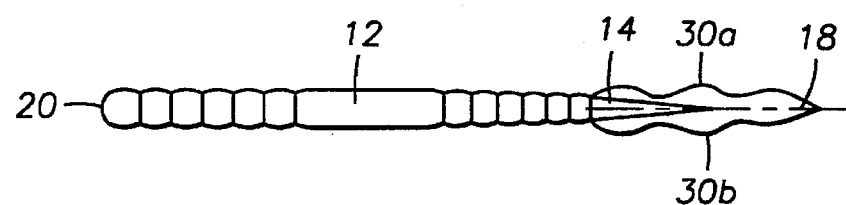
FIG. 7 depicts a worm forming another embodiment of the present invention.

Another embodiment is illustrated by FIG. 7. As shown in FIG. 7, a tail portion 14 is attached to the distal portion of an elongate worm body 12. This tail portion is comprised of a thin, flexible material having two outer edges 30a and 30b and a longitudinal centerline 18. The outer edges 30a and 30b of this tail portion 14 are preferably longer than the length of the centerline 18. The function of the change in length is to create the puckering or wavy characteristics of the tail portion 14. Depending on the orientation of the tail in tow, the worm displays either a horizontal or vertical vibrating, or swimming motion. The tail portion 14 is preferably formed in an injection molding process from soft plastic or rubber which may be biodegradable.

Figure 8:
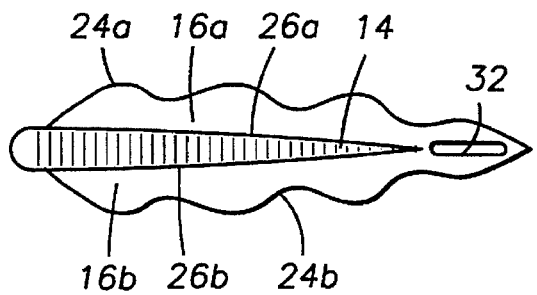
FIG. 8 is a top view depicting the separation of the side fins at the distal portion of a lure embodying the present invention.
Figure 9:
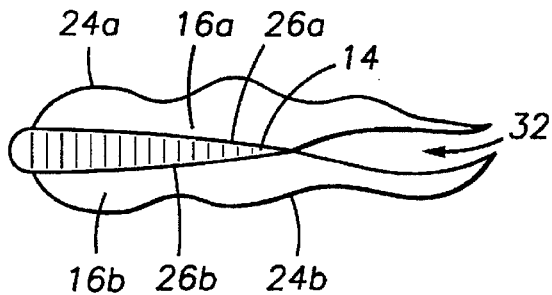
FIG. 9 is a top view depicting the separation of the side fins at the distal portion of a lure embodying the present invention.

FIGS. 8 and 9 illustrate that the fins 16a and 16b may fuse or remain in a split relationship at the distal portion of the body. As shown in FIGS. 8 and 9, a space 32 separates the fins 16a and 16b at the distal tail portion 14. The space 32 can vary in width. FIG. 8 illustrates the tail portion 14 of the fins 16a and 16b which tapers towards the distal portion and defines a narrow space 32. FIG. 9 illustrates another embodiment where the space 32 flares from the distal tail portion toward the distal-most portion of the tail. The outer edges 24a and 24b of the fins 16a and 16b may flare, remain substantially parallel with the lure body 12, or taper towards the centerline 18.

Figure 10:
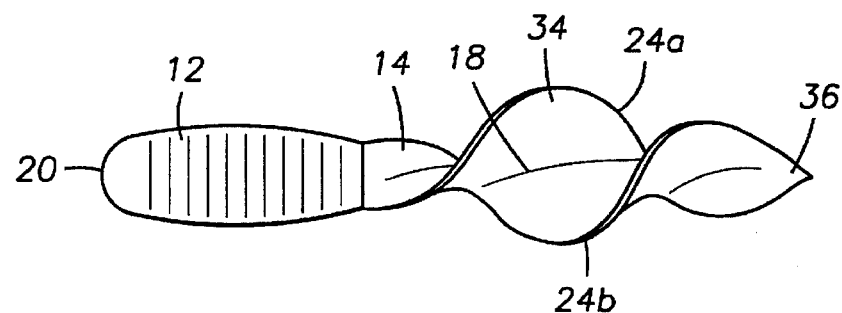
FIG. 10 depicts a side view of an artificial lure comprising another embodiment of the present invention.
Figure 11:
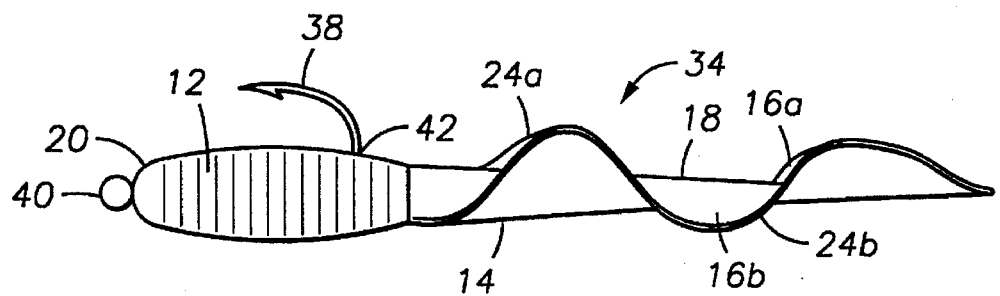
FIG. 11 depicts a side view of the artificial lure of FIG. 10 illustrating the configuration of the helical tail under tow.

FIGS. 10 and 11 illustrate another embodiment. As shown in FIGS. 10 and 11, the elongate body 12 of the lure 10 includes a head portion 20 and a tail 14 which is configured in a double helix. The tail 14 is comprised of two outer edges 24a and 24b and a longitudinal center line 18. Preferably the outer edges 24a and 24b are of greater length than the center line 18. The double helical shape exists in the relaxed state as shown particularly in FIG. 10. In tow through the water, the flow of water over the tail causes straightening of the tail 14 as shown in FIG. 11. The resulting configuration of the tail 14 provides the wavy or ruffled fins 16a and 16b which enable the lure to simulate the swimming motion of different live animals. The tail 14 may taper towards the centerline 18 at the distal-most portion of the lure 10. Also, FIG. 11 shows the typical arrangement of a hook 38 having a weighted head portion 40 inserted through the head portion 20 of the lure and extending out through a midpoint 42 in the elongate body 12. The lure can also be used in conjunction with Texas rigs or Carolina rigs.

Figure 12:
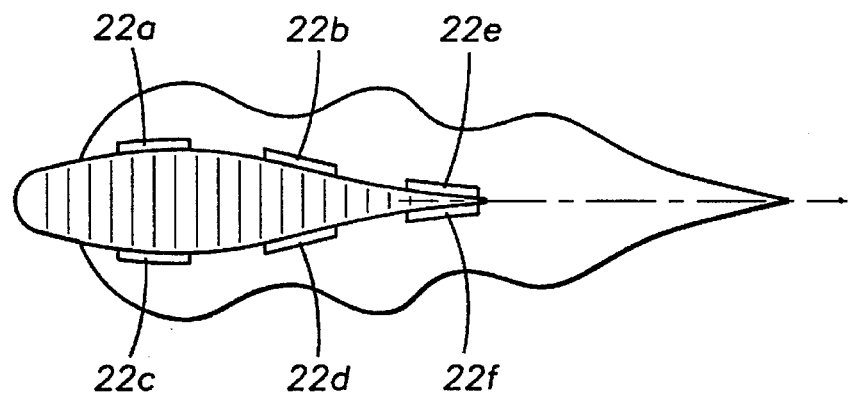
FIG. 12 is a top view of an artificial lure forming another embodiment of the present invention having vents.

FIG. 12 illustrates in greater detail the vented areas 22a, 22b, 22c, 22d, 22e, and 22f spaced along the length of the attached edges 26a and 26b of the fins 16a and 16b. The number of vents can vary from: (1) one on a single fin, (2) one on each fin, or (3) a plurality of vents on one or both of the fins. The vents cause weak areas in the fins which allow the fin to vibrate or undulate as needed. The more flexible fins allow the lure to flutter and display enhanced action. The vents allow water to pass through the openings thereby establishing turbulent flow as opposed to laminar flow across the surface of the fins. This turbulent flow across the fins 16a and 16b increases the vibration of the lure. Similarly, vents 22a, 22b, 22c, 22d, 22e, and 22f can be included at other locations along the fins' surface area to enhance the movement of the lure.

Figure 13:
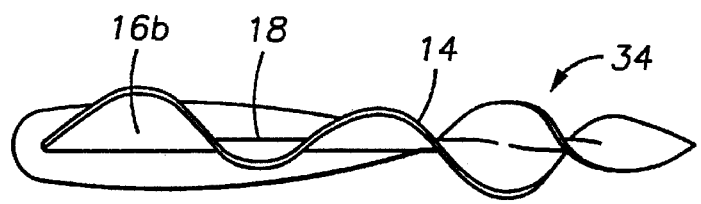
FIG. 13 depicts a side view of an artificial lure forming another embodiment of the present invention.
Figure 14:
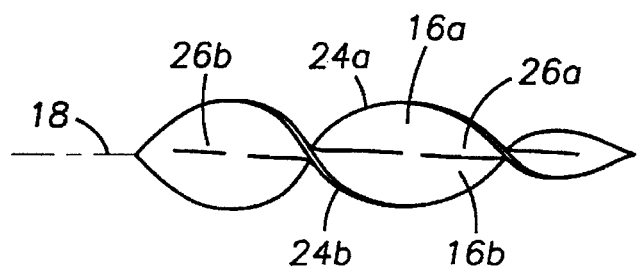
FIG. 14 depicts a side view of a tail forming an embodiment of the present invention.

FIGS. 13 and 14 represent another embodiment wherein the elongate body 12 includes a pair of fins 16a and 16b extending radially from the body 12 along the centerline 18 and a double helical tail 34 extending from the distal tail portion 14 of the body 12. Both the fins 16a and 16b and the helical tail 34 are similar to those described above. The combination of the fins 16a and 16b and the helical tail 34 provide enhanced motion in the lure as well as adding the attractive feature of a moving tail. The force of the water over the tail 34 straightens the tail 34 and cause the outer edges 24a and 24b to become wavy or rippled. The attached edges 26a and 26b are positioned adjacent to one another along the centerline 18.

Figure 15:
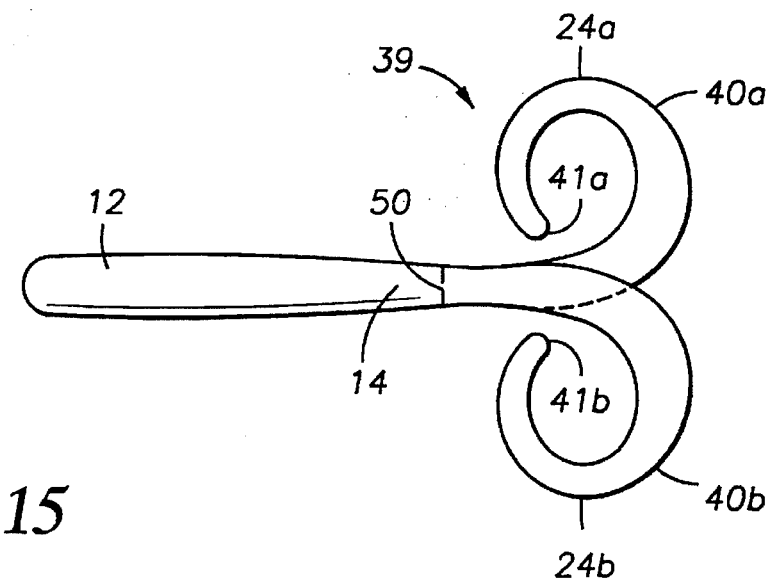
FIG. 15 depicts a top view of a worm having a tail comprising two appendages.
Figure 16:
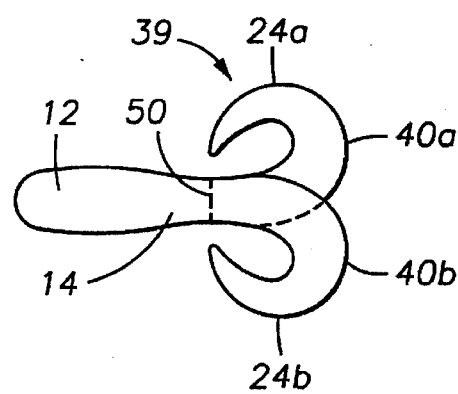
FIG. 16 depicts a top view of a grub having a tail comprising two appendages.

FIGS. 15 and 16 illustrate an embodiment including an elongate body 12 and a tail 39 comprising two sickle shaped appendages 40a and 40b extending from the distal tail portion 14 of the elongate body 12. The tail appendages 40 are flexible, membrane-like members which taper towards the distal portions 41a and 41b of the appendages 40a and 40b. The appendages 40a and 40b are relatively flat in cross-section and are semi-circular in their relaxed state. The two appendages 40a and 40b are separated from one another and connect to the distal tail portion of the body 14 at 50. In the preferred embodiment, the appendages 40a and 40b remain separated from one another along their entire length. The appendages 40a and 40b extend adjacent to one another for the first portion of their length.

Figure 17:
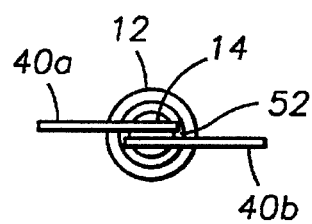
FIG. 17 depicts an end view of the embodiment shown in FIG. 16.

FIG. 17 illustrates that the appendages 40a and 40b are separated from one another and extend from the tail portion 14 of the body 12 in an adjacent relationship. A space 52 is present between the two appendages 40a and 40b. The space 52 between the two appendages 40a and 40b varies. The appendages 40a and 40b are relatively thin in cross-section.

The separation of the two appendages 40a and 40b can be either in the vertical dimension or in the horizontal dimension depending on the desired motion and the orientation of the lure 10. The appendages 40a and 40b are molded or formed in this separated relationship.

Figure 18:
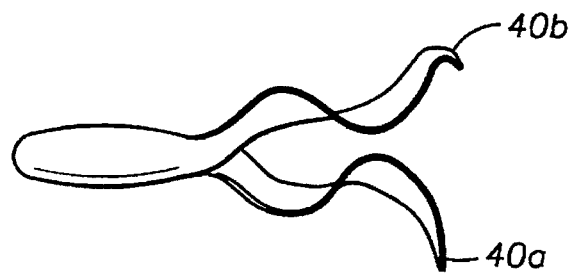
FIG. 18 illustrates the displacement of the appendages of the embodiment shown in FIG. 16 in tow through water.

FIG. 18 illustrates the relationship of the two appendages 40a and 40b under tow through water. The two appendages 40a and 40b separate under the force of the water. The appendages 40a and 40b deflect in the opposite direction as would be anticipated. That is, the appendages 40a and 40b deflect under tow to the opposite side from which they curl in the relaxed state. Comparing FIGS. 16 and 18, the appendages 40a and 40b deflect to change positions. The elongate bodies of FIGS. 16 and 18 remain in the same orientation. Appendage 40a deflects downwardly and appendage 40b deflects upwardly as shown in their similar orientation in FIGS. 16 and 18.

Accordingly, in tow through the water, the force of the flow across the appendages causes straightening of the semi-circular or sickle form of the appendages 40a and 40b. The outer edges 24a and 24b of the appendages 40a and 40b form waves or ripples in tow through the water. The appendages 40a and 40b become distended due to the forces exerted on the fins by the water. The appendages 40a and 40b are usually of greater length than the elongate body 12 of the lure, although they may be shorter. Typically, the appendages 40a and 40b are 125 percent of the body length. Under tow, the appendages have the effect of causing torque on the lure body 12. However, in tandem, the two appendages equalize the exerted torque and cause a vibrating, undulating, or wiggling motion. In the preferred embodiment, the appendages are formed so that the lure 10 will not rotate in tow. Modifications can be made to cause the lure 10 to rotate slightly from side to side simultaneously with the vibrating, undulating, or wiggling motion.

The present invention includes a method of making the lures described above. This method includes the computerized milling of two plates which typically have both concave and convex aspects. In other words, the wavy or rippled portions of the fins are formed solely through the injection molding process. Prior to this invention, the method employed to create waves or ripples on a sole fin was to use molds having concave depressions and mill the elongate body portion in a curved or half-moon position. The fins were milled-out along the curved portion of the body. The outer edges were longer in length than the attached edges, while maintaining a perpendicular relation with the body. On straightening of the lure, the fins possess the wavy or rippled characteristic. This method was limiting because the fin could only be manufactured on one side of the lure body.

The difficulty in manufacturing a two-fined bait is that, until the present invention, die plates were tooled so that each plate was tooled with a concave depression in the shape of one half of the lure. This feature existed out of necessity because, until the advent of computerized milling, it was difficult to match plates for use in the process. It was difficult, if not impossible, to tool molding plates with both concave and convex aspects to each plate. Thus, there remains a need for an artificial lure having two fins extending radially from the lure body which create lifelike movement in the lure.

Computerized milling has enabled the creation of plates having both concave and convex aspects. The plates are computer milled so that the wavy or rippled fins extend above and below the abutting plane of each plate. Consequently, detailed tooling is critical so that the opposed plates match together and provide the desired result.

This process of injection molding forms fins which are not under the stress and forces as seen in the single fin versions which have preceded the present invention. The material is not stretched or strained in the normal, relaxed position. This quality enables the lure to display even greater degrees of vibration in tow while at the same time displaying symmetry of motion along the length of the lure.

It should be apparent that various modifications and changes can be made to the lure of the present disclosure. Such changes may include changes in size, shape, and materials. While several embodiments of the invention have been illustrated in the accompanying drawings and described in the foregoing description of the preferred embodiments, it should be understood that the invention is not limited to the embodiments disclosed, but is capable of numerous rearrangements, modifications, and substitutions of parts and elements without departing from the spirit of the invention.

What is claimed is:

1. A method of making a lure, comprising:
   (a) forming a die having a cavity defining an elongate lure body, said lure body tapering from a proximal end to a distal end thereof, said die cavity further including concave and convex surfaces for forming at least two fins connected along the length of said elongate lure body, said fins merging at the distal end of said elongate lure body and extending therefrom to form a lure tail, and wherein said concave and convex surfaces of said die form said fins to include ruffles so that when the lure is drawn through water it mimics the movement of a living creature moving through water;
   (b) injecting a volume of plastic into the die;
   (c) separating the die after the plastic has cured; and
   (d) removing the lure there formed.

2. A method of making a lure, comprising:
   (a) forming a die having a cavity defining an elongate lure body, said lure body tapering from a proximal end to a distal end thereof, said die cavity further including concave and convex surfaces for forming at least two fins connected along the length of said elongate lure body, said fins merging at the distal end of said elongate lure body and extending therefrom to form a lure tail, and wherein said concave and convex surfaces of said die form said fins to include ruffles so that when the lure is drawn through the water it mimics the movement of a living creature moving through water;
   (b) injecting a volume of biodegradable plastic into the die;
   (c) separating the die after the plastic has cured; and
   (d) removing the lure there formed.

3. A method of making a lure, comprising:
   (a) forming a die having a cavity defining a lure with an elongate body member and a pair of thin, flexible and ruffled fins extending radially from the body member along at least a portion of the length of the body member, each fin having an outer edge and an attached edge wherein the length of the outer edge is greater than the length of the attached edge, said die cavity further including concave and convex surfaces for forming said fins to include ruffles;
   (b) injecting a volume of plastic into the die;
   (c) separating the die after the plastic has cured; and
   (d) removing the lure there formed.

* * * * *